United States Patent
Weimer

(10) Patent No.: US 8,623,159 B2
(45) Date of Patent: Jan. 7, 2014

(54) METHOD FOR PRODUCING A CONTINUOUS, THREE-DIMENSIONAL, CLOSED SEMI-FINISHED PRODUCT MADE OF FIBER COMPOSITE

(75) Inventor: Christian Weimer, Munich (DE)

(73) Assignee: Eurocopter Deutschland GmbH, Donauwoerth (DE)

( * ) Notice: Subject to any disclaimer, the term of this patent is extended or adjusted under 35 U.S.C. 154(b) by 108 days.

(21) Appl. No.: 12/738,987

(22) PCT Filed: Nov. 20, 2008

(86) PCT No.: PCT/DE2008/001917
§ 371 (c)(1),
(2), (4) Date: Apr. 21, 2010

(87) PCT Pub. No.: WO2009/067993
PCT Pub. Date: Jun. 4, 2009

(65) Prior Publication Data
US 2010/0307661 A1   Dec. 9, 2010

(30) Foreign Application Priority Data
Nov. 26, 2007   (DE) .......................... 10 2007 057 110

(51) Int. Cl.
*B29C 70/44* (2006.01)
(52) U.S. Cl.
USPC .............. 156/93; 156/91; 156/217; 156/218; 156/292
(58) Field of Classification Search
USPC .............................. 156/91, 93, 218, 217, 292
See application file for complete search history.

(56) References Cited

U.S. PATENT DOCUMENTS

| 4,410,385 | A | * | 10/1983 | Murphy et al. ................ 156/181 |
| 5,055,242 | A | * | 10/1991 | Vane .............................. 264/463 |
| 6,890,476 | B2 | | 5/2005 | Wagener et al. |
| 7,056,402 | B2 | | 6/2006 | Koerwien et al. |
| 7,138,167 | B2 | | 11/2006 | Sakonjo et al. |
| 7,507,446 | B2 | | 3/2009 | Koerwien et al. |
| 7,641,834 | B2 | | 1/2010 | Weimer |
| 7,858,189 | B2 | | 12/2010 | Wagener et al. |
| 8,308,882 | B2 | | 11/2012 | Weimer |
| 2002/0053400 | A1 | | 5/2002 | Lorenz et al. |

(Continued)

FOREIGN PATENT DOCUMENTS

DE  19925588 A1  12/2000
DE  10050851 A1  4/2002

(Continued)

OTHER PUBLICATIONS

International Search Report dated Jul. 20, 2009, from corresponding PCT application.

(Continued)

*Primary Examiner* — Jeff Aftergut
*Assistant Examiner* — Jaeyun Lee
(74) *Attorney, Agent, or Firm* — Brooks Kushman P.C.

(57) ABSTRACT

A method for producing a continuous, three-dimensional, closed semi-finished product made of fiber composite from at least one planar, flat fibrous preform. The method is characterized in that the flat fibrous preform is initially placed flat and aligned to produce a load-bearing fiber orientation and subsequently formed into a three-dimensional structure. In a final step, the three-dimensional structure is then closed to form a closed semi-finished product.

14 Claims, 3 Drawing Sheets

(56) References Cited

U.S. PATENT DOCUMENTS

| | | |
|---|---|---|
| 2003/0138602 A1 | 7/2003 | Lorenz et al. |
| 2004/0053028 A1* | 3/2004 | Wagener et al. ........... 428/292.1 |
| 2006/0169396 A1 | 8/2006 | Joern |
| 2008/0295755 A1 | 12/2008 | Weimer |

FOREIGN PATENT DOCUMENTS

| | | | |
|---|---|---|---|
| DE | 10250826 A1 | | 5/2004 |
| DE | 102004006615 A1 | | 10/2005 |
| EP | 1 342 544 | | 9/2003 |
| EP | 1529865 A1 | | 5/2005 |
| GB | 2 145 273 | | 3/1985 |
| GB | 2410921 A | * | 8/2005 |
| WO | 02242044 A1 | | 5/2002 |
| WO | 2007/009440 | | 1/2007 |
| WO | WO 2007010053 A1 | * | 1/2007 |

OTHER PUBLICATIONS

German Search Report Dated Nov. 20, 2009, Application No. 10 2007 057 110.2-26, Applicant Eurocopter Deutschland GmbH, 3 Pages.

* cited by examiner

METHOD FOR PRODUCING A CONTINUOUS, THREE-DIMENSIONAL, CLOSED SEMI-FINISHED PRODUCT MADE OF FIBER COMPOSITE

FIELD OF THE INVENTION

The invention relates to a method for producing a continuous, three-dimensional, closed semi-finished product made of fibre composite from a planar, flat, fibrous perform as recited in claim 1.

BACKGROUND OF THE INVENTION

It is known that shell-shaped components in aerospace applications are always constructed and reinforced with strut and rib structures, or sandwich elements.

If such structures have been manufactured using a carbon fibre construction method, each reinforcing element is formed from a web material, cut to a size corresponding to the respective component, and then individually processed further with manufacturing equipment to yield the component.

In the past, this method led to the development of the braiding process, which in turn enables the creation of closed semi-finished tubular products. However, these semi-finished tubular products that are manufactured by braiding, and the reinforcing elements that are produced from them, do not allow design engineers any "design freedom", they are expensive to make, and present handling difficulties during fabrication. The difficulty of ensuring that fibres are aligned to provide optimum load conditions represents a significant obstacle to the more widespread application of this technology.

OBJECTS AND SUMMARY OF THE INVENTION

In the context of the disadvantages outlined above, the object of the present invention is to suggest a production method for the continuous, three-dimensional, closed semi-finished product made of fibre composite, that enables a semi-finished product, to be used for example in producing a reinforcing structure for a shell-like construction, to be manufactured simply, inexpensively, and in such manner that optimum load conditions are assured.

This object is solved by the features of claim 1.

The dependent claims 2 to 10 describe advantageous refinements of the invention.

The method according to the invention for producing a continuous, three-dimensional, closed semi-finished product made of fibre composite from a planar, flat, fibrous preform consists of the following steps:

a) laying the planar, flat, fibrous perform flat;
b) aligning the planar, flat, fibrous perform to ensure optimum load-bearing orientation of the fibres in the flat, fibrous preform;
c) forming the planar, flat, fibrous perform into a three-dimensional structure, and
d) closing the three-dimensional structure to create the semi-finished product made from fibre composite material.

In the method according to the invention, fibre architectures in planar form that are used for producing the semi-finished products are already compacted to their final thickness but are still flexible enough to be manipulated, so the manufacturing process may be kept simple and inexpensive. In particular, it is possible to ensure that the fibres are aligned simply for optimum load-bearing orientation and characteristic. A further advantage is that no additional production equipment for preparing the preforms are necessary in the production process.

The new, closed semi-finished product produced thereby may either be used to make a complete component in further perform assembly processes, or processed further in a pull-trusion process.

The three-dimensional structure is preferably closed by sewing. Closing the three-dimensional structure by sewing is particularly advantageous since this is not only easily manageable as a manufacturing step, it also enables the joint location to be simply configured in various ways.

To ensure that the semi-finished goods of fibre composite are structured to offer optimum load-bearing characteristics, steps a) and b) are repeated several times, that is to say, additional layers of the planar, flat fibre perform are laid on top of a first layer of a planar, flat semi-finished product made from the fibre composite, and these are then also aligned according to the requirements of the component. The planar, flat fibre performs that are placed on top of each other in this way may also be configured in different ways. That is to say, a layer of a different, second, planar, flat fibrous perform is deposited on top of the first layer of the first planar, flat fibrous perform. Thus, for example, fibrous performs also produced by different production methods (weaving, knitting, sewing, stitching, etc.) might be used to create a special layer structure.

These fibrous perform layers that are now arranged one on top of the other are preferably joined to each other to yield a three-dimensional structure before they are formed. The effect of joining is that it prevents any undesirable slippage of the layers during the forming step.

According to a particularly advantageous embodiment of the method according to the invention, the layers of fibrous performs lying on top of each other are joined by sewing.

The material used for sewing to close the three-dimensional structure and/or for sewing to join the layers to each other is preferably a stretchable and/or rigid and/or meltable thread material. Depending on the use of the materials described above as the thread, it is a simple matter to modify the joint location or join between layers. For example, using a stretchable thread material for sewing to close the three-dimensional structure renders the closed structure more flexible in its subsequent application.

Sewing is preferably carried out using a feed-off-the-arm stitcher or a 3D stitching robot. This ensures fast, precise seaming.

According to one embodiment of the invention, the planar, flat, fibrous perform layers are formed in a pleating process. The profile of the closed semi-finished product created thereby may be circular, but may also be rectilinear with tight radii, or similarly shaped.

According to a particularly advantageous embodiment of the method according to the invention, the three-dimensional, closed semi-finished product made from fibre composite material undergoes a heating process upon completion of step d). This has proven to be particularly advantageous when a meltable thread is used for sewing both to close the web material and to join the layers together. For example, if a meltable thread is used to join the various fibrous preform layers that are lying on top of each other, this—unmelted—thread is distributed throughout the structure after the layers have been closed to form a three-dimensional structure. The subsequent heating process and the associated melting of the thread material advantageously creates a continuous join that permeates the entire closed structure.

According to a further embodiment of the method according to the invention, the three-dimensional, closed semi-finished product made from fibre composite material is draped over a core upon completion of step d).

Further advantages, features, and possible applications of the present invention will be apparent from the following description in conjunction with the embodiments illustrated in the drawing.

BRIEF DESCRIPTION OF THE DRAWINGS

In the following, the invention will be described in greater detail with reference to the embodiment shown in the drawing.

In the drawing.

MORE DETAILED DESCRIPTION

Figure 1:
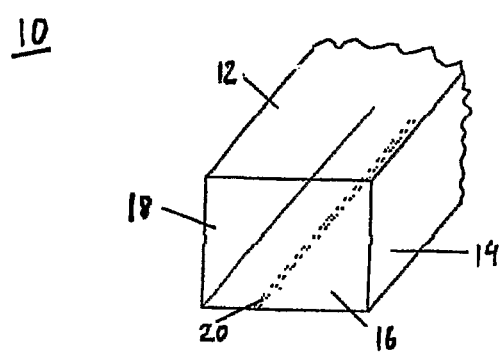
FIG. 1 shows a cross section of a reinforcing structural profile manufactured continuously according to the method of the invention.

FIG. 1 is a more a less diagrammatic cross section of a three-dimensional semi-finished product in the form of a reinforcing structural profile, designated overall by reference number 10. Reinforcing structure profile 10 is constructed from several layers of planar, flat fibrous performs and has an essentially square cross sectional area.

The fibre architecture and nature of the planar, flat fibrous performs have been selected such that each of the lateral surfaces 12, 14, 16, 18 of reinforcing structural profile 10 has a precisely defined layer composition.

Having been aligned and adjusted to yield the desired fibre architecture, and formed to produce the essentially square cross section as shown, the structure in this case was closed using a continuously operating feed-off-the-arm stitcher. The stitches 20 created serve to stabilise the material and enable it to be processed further in the dry state.

The "tube" created thereby may for example be draped over a core in a subsequent step. In this context, the seam continues to lend the textile pre-product flexibility and drapability.

However, the positions of the individual side walls are positioned precisely by the seam. The dry tube may be cut to the size required for the core material that is to be assembled. Other aids, e.g. draping tools or trimming templates may thus be dispensed with.

Figure 2:
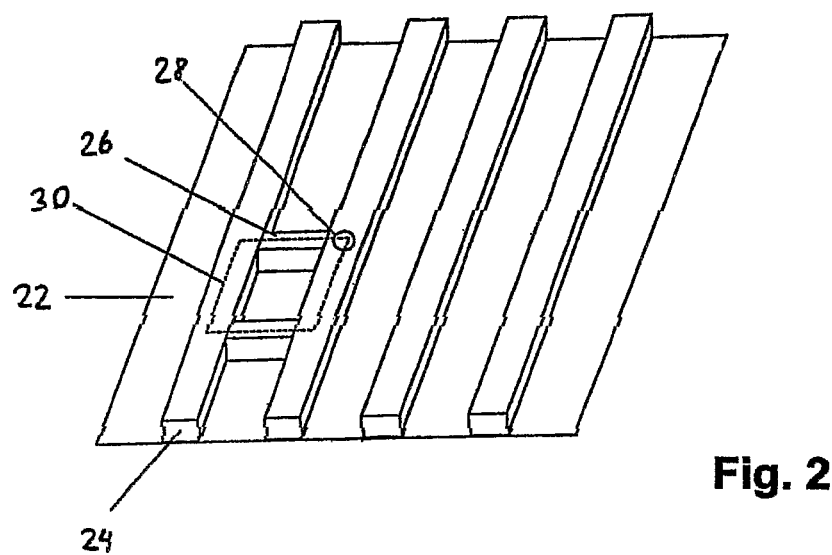
FIG. 2 shows a top panel of a carbon fibre floor panel with reinforcing structural profiles manufactured according to the method of the invention.
Figure 3:
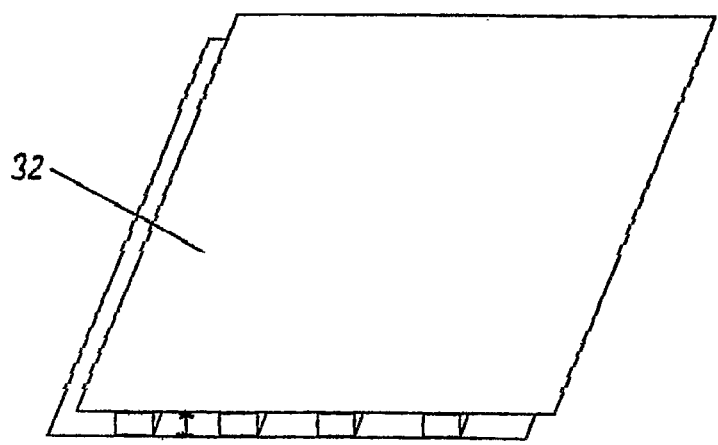
FIG. 3 shows the floor panel of FIG. 2 after a cover layer has been applied.

FIG. 2 and FIG. 3 both represent an essentially planar shell structure, having the form of a helicopter floor panel, which is to be reinforced.

It is apparent that the use of a semi-finished product manufactured according to the method of the invention will enable all struts and ribs to be introduced. The individual "strips" thus represent unit elements, which may be cut to size to match the construction and local nature of the floor (anchor points, tank ring, cover for load hook, etc.), placed on a core and hardened. Solid core materials may then be inserted (between the ribs) for exact positioning.

In the example shown, longitudinal ribs 24 and transverse ribs 26 are provided as reinforcement on a cover layer 22. Reference number 28 indicates additional reinforcing patches for local reinforcement, and reference number 30 indicates an exemplary arrangement of the profiles to form a reinforcing group, e.g. a frame for a load hook.

After the individual reinforcing elements and other functional groups have been positioned, the component is infiltrated and hardened in a vacuum infusion technique.

In order to create the "carbon fibre floor" sandwich panel, the top or bottom shell is also bonded to a cover layer 32 in an infiltration process.

KEY TO LEGEND

10 Reinforcing structure profile
12 lateral surface
14 lateral surface
16 lateral surface
18 lateral surface
20 Seam
22 Cover layer
24 Longitudinal rib
26 Transverse rib
28 Reinforcement patches
30 Rigidity group
32 Cover layer

What is claimed is:

1. A method for producing a continuous, three-dimensional, closed semi-finished product made of fiber composite from a planar, fibrous preform, comprising the steps of:
   a) providing a planar, fibrous preform having a first thickness, a width, a length, a first end extending along the length and a second end extending along the length and spaced the width from the first end, and laying the planar, fibrous preform flat;
   b) aligning the planar, fibrous preform to ensure optimum load bearing orientation of the fibers in the planar fibrous preform, and compacting the fibrous preform to a final thickness, the final thickness being less than the first thickness, the compacted preform, after being compacted to the final thickness, being sufficiently flexible to enable the compacted preform to be manipulated into a three-dimensional structure;
   c) forming the compacted planar, fibrous preform into a three-dimensional structure by contacting the first end with the second end to form a four-sided polygonal tube;
   d) closing the four-sided polygonal tube by sewing together the ends of the compacted preform along the length of the preform with a stretchable and meltable thread material to form a flexible closed four-sided polygonal tube that is flexible along its length.

2. The method as recited in claim 1, wherein steps a) and b) are carried out repeatedly with additional planar, fibrous preforms before step c) is performed.

3. The method as recited in claim 2, wherein the planar, fibrous preforms are joined to each other.

4. The method as recited in claim 1, wherein sewing is carried out with a feed-off-the-arm stitcher or a 3D stitching robot.

5. The method as recited in claim 1, wherein in step c) the planar fibrous preform(s) is/are deformed to produce the three-dimensional structure by a pleating process.

6. The method as recited in claim 1, wherein the three-dimensional, closed semi-finished product made from fiber composite material undergoes a heating process to melt the thread material after step d) is complete, thereby creating a continuous joint that permeates the fiber architectures.

7. The method as recited in claim 1, wherein the three-dimensional, closed semi-finished product made from fiber composite material is draped over a core after step d) is complete.

8. The method as recited in claim 2, wherein sewing is carried out with a feed-off-the-arm stitcher or a 3D stitching robot.

9. The method as recited in claim 1, wherein the step of sewing the ends together in step d) comprises abutting the first end against the second end and sewing the ends together.

10. A method for making a planar shell composite structure, said method comprising:
    producing a continuous, three-dimensional, closed semi-finished composite tube made of fiber composite from a planar, fibrous preform, comprising the steps of:
      a) laying the planar, fibrous preform flat, the preform having a length, a width, a first end and a second end spaced the width from the first end;
      b) aligning the planar, fibrous preform to ensure optimum load bearing orientation of the fibers in the planar fibrous preform layer, and compacting the fibrous preform to a final thickness, the final thickness being sufficiently flexible to enable the compacted preform to be manipulated into a three-dimensional structure;
      c) moving the first end of the compacted preform towards the second end of the compacted preform to form a three-dimensional polygon-shaped structure having four walls, with each of the four walls being flexible; and
      d) joining the first and second ends of the planar, fibrous compacted preform together by sewing with a stretchable and meltable thread to form a composite tube;
    providing a first panel;
    cutting several tube portions from the composite tube;
    placing the tube portions on the first panel;
    placing a second panel over the tube potions placed on the first panel; and
    hardening the tube portions, the hardened tube portions between the first and second panels forming the planar shell composite structure.

11. The method as recited in claim 10, wherein the step of moving the first end towards the second end in step c) comprises abutting the first end against the second end and step d) takes place after step c) so that the first and second ends, when joined together, abut each other.

12. The method as recited in claim 10, wherein the three-dimensional, closed semi-finished product made from fiber composite material undergoes a heating process to melt the thread material after step d) is complete, thereby creating a continuous joint that permeates the fiber architectures.

13. A method for producing a continuous, three-dimensional, closed semi-finished product made of fiber composite from a planar, fibrous preform, comprising the steps of:
    a) laying the planar, fibrous preform flat, the preform having a length, a width, a first end and a second end spaced the width from the first end;
    b) aligning the planar, fibrous preform to ensure optimum load bearing orientation of the fibers in the planar fibrous preform layer, and compacting the fibrous preform to a final thickness, the final thickness being sufficiently flexible to enable the compacted preform to be manipulated into a three-dimensional structure;
    c) moving the first end of the compacted preform towards the second end of the compacted preform to form a three-dimensional polygon-shaped structure having four walls, with each of the four walls being flexible; and
    d) joining the first and second ends of the planar, fibrous compacted preform together by sewing with a stretchable and meltable thread.

14. The method as recited in claim 13, wherein the three-dimensional, closed semi-finished product made from fiber composite material undergoes a heating process to melt the thread material after step d) is complete, thereby creating a continuous joint that permeates the fiber architectures.

* * * * *